(12) United States Patent
Oldfield et al.

(10) Patent No.: US 9,979,499 B2
(45) Date of Patent: May 22, 2018

(54) ASSISTIVE MIXING SYSTEM AND METHOD OF ASSEMBLING A SYNCHRONISED SPATIAL SOUND STAGE

(71) Applicant: University of Salford Enterprises Limited, Salford (GB)

(72) Inventors: Robert George Oldfield, Manchester (GB); Benjamin Guy Shirley, Manchester (GB)

(73) Assignee: UNIVERSITY OF SALFORD ENTERPRISES LIMITED, Salford (GB)

(*) Notice: Subject to any disclaimer, the term of this patent is extended or adjusted under 35 U.S.C. 154(b) by 0 days. days.

(21) Appl. No.: 15/522,391

(22) PCT Filed: Oct. 26, 2015

(86) PCT No.: PCT/GB2015/053207
§ 371 (c)(1),
(2) Date: Apr. 27, 2017

(87) PCT Pub. No.: WO2016/067007
PCT Pub. Date: May 6, 2016

(65) Prior Publication Data
US 2017/0338903 A1    Nov. 23, 2017

(30) Foreign Application Priority Data

Oct. 31, 2014   (GB) .................................. 1419396.5

(51) Int. Cl.
*H04H 60/04* (2008.01)
*G11B 27/028* (2006.01)
(Continued)

(52) U.S. Cl.
CPC .......... *H04H 60/04* (2013.01); *G10H 1/0008* (2013.01); *G11B 27/028* (2013.01); *H04S 3/00* (2013.01)

(58) Field of Classification Search
None
See application file for complete search history.

(56) References Cited

U.S. PATENT DOCUMENTS

2002/0026311 A1* 2/2002 Okitsu .................... G10L 15/26
704/201
2006/0212897 A1    9/2006 Li et al.
(Continued)

FOREIGN PATENT DOCUMENTS

JP         3294457 B2    4/2002
WO    2006112822 A1   10/2006

OTHER PUBLICATIONS

Robert Oldfield et al., "Object-based audio for interactive football broadcast", May 1, 2013, vol. 74, No. 8, pp. 2717-2741.*
(Continued)

*Primary Examiner* — Paul Huber
(74) *Attorney, Agent, or Firm* — Notaro, Michalos & Zaccaria P.C.

(57) ABSTRACT

Intensifying contextually relevant sound events for time-delayed broadcast uses multiple directional microphones that capture sound events from a specific location within regions of a stadium. The events are contextually relevant to the environment, such as a referee's whistle sound. A processor executes signal processing of the captured events on each channel to produce audio samples each having a signal profile. The profiles are automatically compared to reference feature templates stored in a database, correspond to pre-identified sound events of contextual relevance. The signal processing accentuates characteristic traits in the events, reflective of contextually relevant events that should
(Continued)

be included in a final composite audio output for transmission. If the comparison of samples to the feature templates suggests a high probability of a correspondence, then buffered audio for that channel is introduced into a final audio mix.

18 Claims, 5 Drawing Sheets

(51) Int. Cl.
*G10H 1/00* (2006.01)
*H04S 3/00* (2006.01)

(56) References Cited

U.S. PATENT DOCUMENTS

| | | | |
|---|---|---|---|
| 2009/0232325 A1* | 9/2009 | Lundquist | H03G 3/32 381/74 |
| 2011/0025499 A1* | 2/2011 | Hoy | G08B 3/10 340/540 |
| 2014/0044269 A1* | 2/2014 | Anderson | H04R 5/04 381/57 |

OTHER PUBLICATIONS

International Search Report and Written Opinion for corresponding PCT application No. PCT/GB2015/053207, dated Jan. 22, 2016.

* cited by examiner

ASSISTIVE MIXING SYSTEM AND METHOD OF ASSEMBLING A SYNCHRONISED SPATIAL SOUND STAGE

FIELD OF THE INVENTION

This invention relates, in general, to audio mixing and is particularly, but not exclusively, applicable to an automated system of real-time recording and assisted spatial audio mixing of live stadia-based events that are broadcast, such as televised soccer matches and the like.

SUMMARY OF THE PRIOR ART

Traditionally, the audio for television or radio broadcasts of stadia-based events, such as a soccer match, is recorded using a combination of: i) typically twelve (directional) shotgun microphones positioned nominally equi-distance around the edge of pitch and configured predominantly to capture discrete on-pitch/action sounds of specific interest; and ii) a high-mounted Soundfield® microphone (or stereo pair) used to capture more diffuse ambient crowd noise and which high-mounted arrangement permits easy control of general surges in noise levels from spectators.

To present an overall sound stage representative of instantaneous stadium atmosphere and events, a professionally-qualified sound engineer operates a mixing desk to control the level of the crowd noise in the mix from these microphones. Control involves observation of on-field action and appropriate manual dynamic control of faders that adjust (i.e. either bring up or diminish) audio contribution levels from identified shotgun microphone when instantaneous play within a specific part of the game field generates related audio that is worthy of inclusion in the overall audio mix. Moreover, besides having to watch live action events, the sound engineer's decision(s) on raising or lowering faders are also typically influenced by the current visual/video camera feed from the producer.

Audio level mixing control is applied for a couple of reasons, namely (i) to control the level of the crowd noise and (ii) to avoid so-called non-diegetic sounds (e.g. narrator's commentary) being added into the mix, whilst still including all diegetic sounds (i.e. sound whose source is visible on the screen or whose source is implied to be present by the action, e.g. player's voices and the sound of ball kicks) from the scene. If all of the microphones are simply left "high" in the mix there will be too much crowd noise and action sounds of particular interest will be masked and not heard.

Standard practice for the mixing of audio for television and radio broadcasts of live events involves the sound engineer dynamically raising and lowering the faders on a mixing desk corresponding to the microphones in the region (s) of interest at a given point in time. More particularly, the aim is to only raise the level of a specific fader for a specific microphone feed (i.e. to add that microphone channel into the mix) when relevant action on the pitch is within the vicinity of the given microphone. The sound engineer consequently both applies a degree of subjectivity in terms of selection of the audio input mix and, moreover, must exercise a high degree of concentration in trying to follow quickly evolving events that occur widely (and to some extent randomly) across the environs of the field of play, including potentially along each touchline. Events can therefore be missed.

In terms of known techniques for audio mixing, the iBall application from Calrec® Audio Limited utilises an iPad for the assisted mixing of the audio for soccer match broadcasts. This process is described in the conference paper by Henry Bourne and Joshua D. Reiss: "Evaluating iBall—An intuitive interface and assistive audio mixing algorithm for live soccer events", 135th Conv. Audio Eng. Soc., New York, 2013.

Another manual-based mixing technique is described in the paper by Cengarle, G., Mateos, T., Olaiz, N., and Arumi, P. (2010): "A New Technology for the Assisted Mixing of Sport Events: Application to Live Football Broadcasting" published in Proceedings of the 128th Cony. Audio Eng. Soc. London, UK. In this paper, the sound engineer is presented with a user interface where he or she can define and move dynamically the point of interest on a screen representing the pitch, while the application controls the faders of the broadcast console.

Other technical papers related to audio mixing include those authored co-authored by Dr Rob Oldfield Dr Ben Shirley, including: i) "Automatic Mixing and Tracking of On-Pitch Football Action for Television Broadcasts" published in 2011 in Proc. 130th Convention of the Audio Engineering Society, AES, London, UK; ii) "Demo paper: Audio object extraction for live sports broadcast" published in Multimedia and Expo Workshops (ICMEW), 2013 IEEE International Conference on', IEEE, San Jose, USA; iii) "Object-based audio for interactive football broadcast" published in 2012 in Multimedia Tools and Applications. DOI: 10.1007/s11042-013-1472-2; and iv) "Format Agnostic Recording and Spatial Audio Reproduction of Football Broadcasts for the Television" published in 2011 in the Proceedings of the Institute of Acoustics, Reproduced Sound, Brighton, UK.

SUMMARY OF THE INVENTION

According to a first aspect of the invention there is provided a mixing system comprising: a multiplicity of microphones, each of said microphones assigned to a channel and configured to capture real-time sound events within a coverage region for that microphone; a buffer for storing captured sound events from each microphone; a memory storing at least one reference feature template indicative of a predetermined desired sound event; a processor configured to execute a control algorithm that: processes captured real-time sound events for each channel into samples having signal characteristics; for each channel, compares the signal characteristics in each sample with said at least one reference feature template to identify whether said captured real-time sound event has signal characteristics substantially corresponding to at least one reference feature template; and in the event that the comparison indicates that correlation exists between the desired sound event and the captured real-time sound event for the channel, generating a final audio mix that includes at least one of (i) said captured real-time sound event for the channel and (ii) a substitute or enhanced audio output for the captured real-time sound event.

In a second aspect of the present invention there is provided a method of assembling a time synchronized sound stage for broadcast, the method comprising: capturing real-time sound events at a multiplicity of microphones, each of said microphones assigned to a channel and a coverage region; buffering captured sound events from each microphone; signal processing captured real-time sound events for each channel into samples having signal characteristics; for each channel, comparing the signal characteristics in each sample with at least one reference feature template to identify whether said captured real-time sound event has signal characteristics substantially corresponding to said at least one reference feature template captured real-time sound event, each reference feature template indicative of a predetermined desired sound event; in the event that the comparison indicates that correlation exists between the desired sound event and the captured real-time sound event for the channel, generating a final audio mix that includes at least one of: (i) said captured real-time sound event for the channel; and (ii) a substitute or enhanced audio output for the captured real-time sound event.

In another aspect of the invention there is provided a computer program product including code that, when executed by a processor, performs audio mixing functions according to any of claims 11 to 17.

The present invention advantageously provides a software solution that automatically assists the mixing of the audio for the broadcast of live events to provide high quality audio mixes even for inexperienced operatives. The control algorithms of the various embodiments react to detected audio events to support retrospective addition of corresponding microphone feeds into the mix (for broadcast as an audio signal or composite audio-video/TV broadcast). More particularly, the control algorithms beneficially do not require human input to describe where contextually relevant sound events are occurring (within a stage, such as a stadium) in order to produce the mix, but rather audio mixing decisions are based only on the received audio content captured at each microphone. The present invention therefore provides a high-quality audio mix for broadcast that includes all the salient events and which is produced without the need for highly experienced operatives.

The signal processing of captured audio is designed and selected to accentuate characteristic traits in captured sound events that are reflective of contextually relevant sound events that should be included in a final composite (mixed) audio output for transmission. Reference audio feature templates stored in a database correspond to pre-identified sound events of contextual relevance. Once identified as being present by comparison of samples (or groups of multiple samples—sometimes referred to as "chunks") against one or more feature template, the original captured contextually relevant sound events are extracted from a buffer and assembled into a time (and optionally spatially) synchronized audio output suitable for broadcast.

BRIEF DESCRIPTION OF THE DRAWINGS

Exemplary embodiments of the present invention will now be described with reference to the accompanying drawings, in which.

DETAILED DESCRIPTION OF A PREFERRED EMBODIMENT

Figure 1:
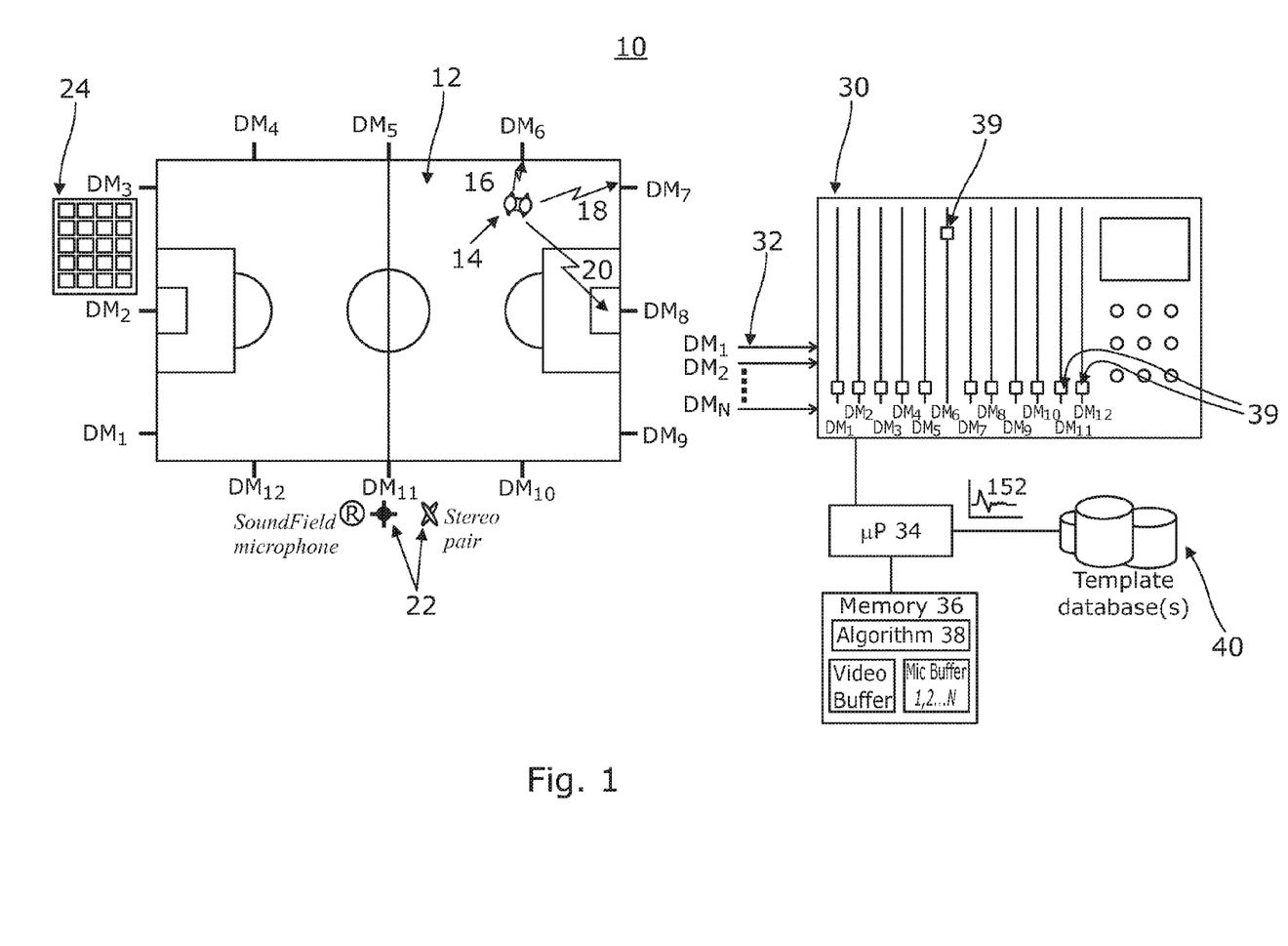
FIG. 1 is a functional block diagram of an audio mixing system according to a preferred embodiment of the present invention.

FIG. 1 is a functional block diagram of an audio mixing system according to a preferred embodiment of the present invention. The system 10 is shown in the context of a sports field, such as a soccer pitch 12, that has a multiplicity (in this case twelve) directional microphones ($DM_1$, $DM_2$ ... $DM_{12}$) spaced around the periphery of the pitch 12 and having sound capture regions directed over segments of the pitch. Of course, fewer (such as four) or more direction microphones $DM_n$ could be employed in the system, with the twelve of FIG. 1 being generally equally spaced along each of the four sides of the pitch 12. In dotted grid pattern applied over the pitch 12 reflects the approximate sound coverage regions for each directional microphone; these regions can be considered as nominally rectangular, albeit the regions in reality will generally be lobed-shaped, as will be understood.

For the sake of explanation, a soccer ball 14 is shown as being located within a region covered by direction microphone $DM_6$. Sound waves 16 associated with ball contact will therefore predominantly be picked up by direction microphone $DM_6$ and these sound waves arriving at the directional microphone soonest and with the highest sound energy. Of course, depending on precise ball position within the coverage region and its closeness to nominal sound detection boundaries indicated by the grid lines, other relatively closely positioned directional microphones (such as $DM_7$ and $DM_{10}$) may pick up the sound waves 18-20 that are slightly offset/delayed in time based on sound wave propagation times from the ball to the direction microphone. Of course, in the general case, sound energy level in sound waves picked up at progressively farther displaced directional microphones will be reduced relative to the closest microphone (i.e. direction microphone $DM_6$ in the case of FIG. 1) to the sound event, so selection of the microphone feed for an audio mix may make use of signal envelope analysis to relate identical sound events detected by different directional microphones. It will be understood that event noise detection is influenced and affected by prevailing weather conditions (such as wind, etc.) and, additionally, processing within a particular channel relative to another channel, e.g. filtering caused by the presence of compressor or limiters.

Conventionally, the system 10 further includes a Soundfield® microphone (or stereo pair) 22 for wide area, diffuse sound capture, such as from seating areas 24 (only one of which is shown for reasons of diagram clarity) extending backwards and away from a pitch 12. At least one Soundfield® microphone 22 is typically located, as indicated above, at a relatively high (and generally centralized) level above the pitch and/or seating area 12. The Soundfield® microphone 22 is typically set at a fixed level, with sound objects from directional microphones dynamically mixed over the ambient background provided by the Soundfield® microphone 22.

An audio mixing unit 30, coupled to receive captured representations of sounds 16-20 from the directional microphones ($DM_1$ to $DM_n$) as line inputs 32, is operationally controlled by at least one microprocessor 34. The microprocessor 34 is coupled to (or otherwise has) a memory 36 that stores a control algorithm 38 for sound processing and fader control. The memory 38 further supports sound buffering of sound events for each of the directional microphones $DM_n$ and typically will also support video buffering. Buffering is required to address latency arising from signal propagation and signal processing, and is used to permit audio channel synchronization of active directional microphones and/or with captured video images for AV broadcasts (whether streamed over wire or transmitted using wireless communication techniques). The maximum audio latency is determined by how long it takes to detect audio events captured from each of the directional microphones in the array.

A template database 40, coupled to the microprocessor 34, includes pre-stored sound profile features that permit correlation between detected sound events captured by the directional microphones and sound events of specific interest that warrant inclusion in an audio mix. The pre-stored sound profile features model or otherwise represent actual sounds associated with particular events, such as (in the context of a game of soccer) a referee's whistle and the sound generated when a soccer ball is kicked with varying levels of power.

In overview, the control algorithm 38 controls the audio mixing process automatically by selecting microphones and/or mix levels based on detected events that are considered contextually relevant to the recording (and ultimately broadcast) of the event. The control algorithm operates to mix the key on-pitch sounds (e.g. ball kicks, whistle blows or other audible alerts or warning sounds) for broadcast and preferably (but optionally) determines their position on the pitch typically based on received microphone inputs. The extracted "audio objects"—which can be discrete sound sources from a whistle or a ball kick and/or speech—can then be positioned in space (but at least included in the audio mix) for reproduction using any spatial audio system, i.e. there may be weighting of directional microphone feeds within the context of the audio loudspeaker reproduction system. Of course, the audio mix can be configured to produce a dual mono audio sound stage from a stereo pair of loudspeakers (or a mono-output from 3.1, 5.1 and 7.1 speaker configurations). This audio mix control corresponds to a paradigm shift for such broadcasts where on-pitch sounds are, in pre-existing prior art systems, panned to front-centre only. Regardless, operation of the control algorithm permits identification and selection of audio objects for inclusion in an audio mix regardless of sound engineer observations and manual directional microphone selection. In other words, implementation of the various embodiments of the present invention does not require human input to describe where the sound is in order to produce the audio mix, but rather it is an entirely software-based solution that makes mixing decisions based only on the received audio content at each microphone. The control algorithm 38 therefore functions to track, for example, the soccer ball spatially through selection and control of fader positions (reference numbers 39 of FIG. 1) that controls throughput of sound objects (from contextually relevant events, such as ball kicks and whistles) into a composite sound stage. As indicated previously, the sound objects may be spatially displaced within the sound reproduction system by weighting of a particular loudspeaker's contribution to the audio mix, but equally the total sound may be positioned centrally within an overall sound stage generated by the audio mixing and, especially, the relative fader positions that set audio component contributions for each of the individual directional microphone channels. The control algorithm 38 therefore provides for assisted mixing in the broadcast of events, such as prevalent in the arts and sports.

The control algorithm 38 is configured to 'listen' to and then analyse each of the directional microphone feeds in (essentially) real-time. This analysis may require signal processing of each time domain signal to produce a spectral representation containing a more discernible characteristic whose presence (or absence) supports a high degree of decision confidence. More specifically, a comparison of each spectral representation against pre-defined audio feature templates allows the processor 36 to determine whether a predetermined threshold level has been passed. Based on the type of spectral representation, the threshold level can be set/adjusted so as to alter a level of confidence in the result of the comparison. Surpassing the predetermined threshold level therefore indicates that a significant audio event of interest has occurred and that the significant audio event warrants inclusion in the audio mix.

It is noted that since processing takes a finite time, broadcasts have an inherent latency relative to real-time and that the assembling of the sound stage (from the various automatically selected directional microphone feeds) delays any final broadcast. In other words, when such a significant audio event occurs the control algorithm is configured to retrospectively add the corresponding microphone channel into the audio mix.

From an operational perspective, when the control algorithm 38 detects an audio event of interest, it is configured initially to raise automatically the fader on the mixing desk 30 and then subsequently lower that fader after a given time if no further event is detected. Fader actuation is facilitated using motorised fader control on the mixing desk, as will be understood. Preferably, the control algorithm is configured to permit the sound engineer (manning the mixing desk 30) selectively over-riding automated mixing simply; this may involve (for example) the sound engineer touching a relevant fader to release automatic control thereof. Selective over-ride provides a system of assistive audio mixing, rather than fully automatic mixing.

Figure 2:
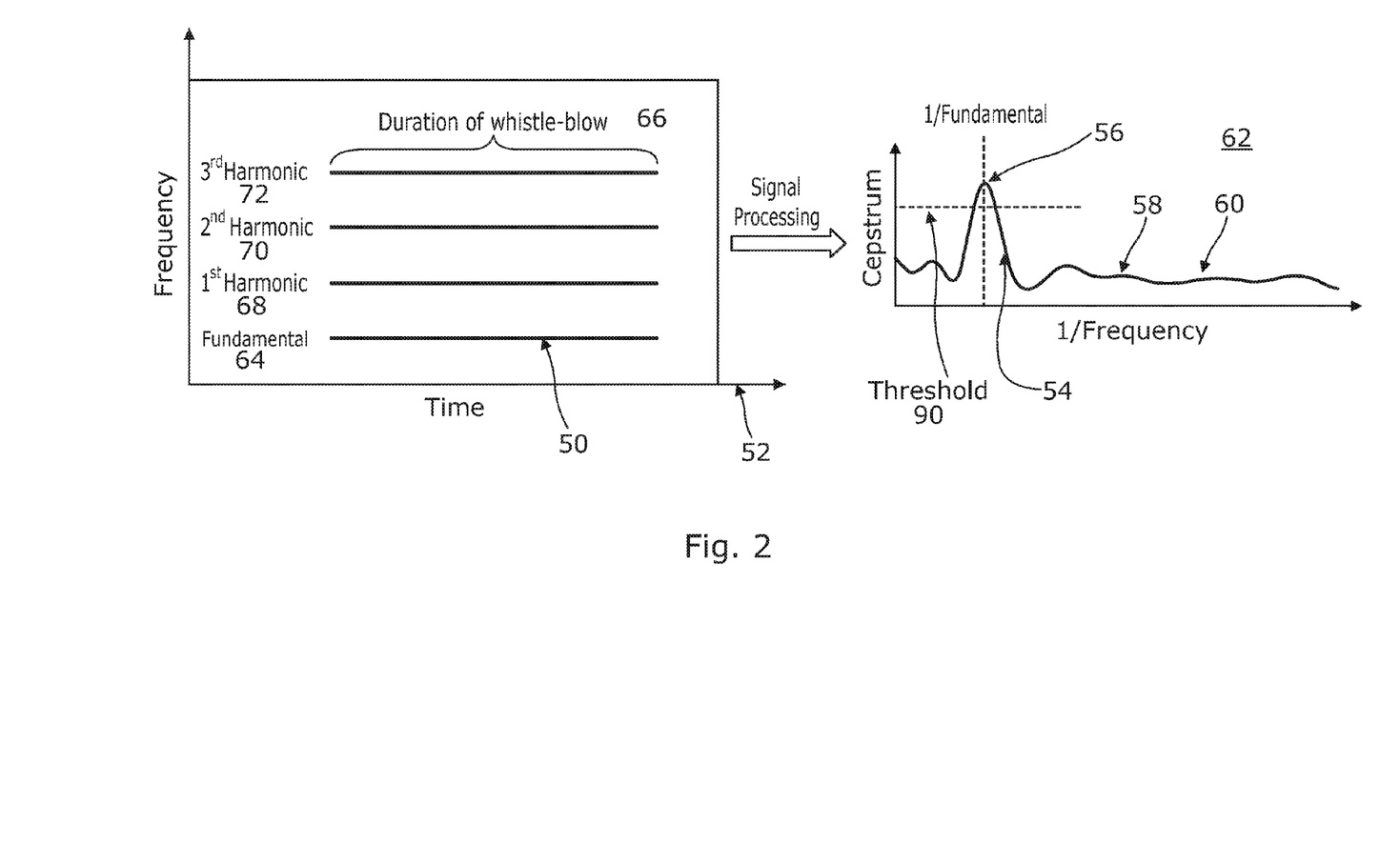
FIG. 2 shows a transposition of a first captured audio event in the time domain into a corresponding spectral profile having a discernible characteristic in the frequency domain.

FIG. 2 shows transposition of a first captured audio event 50 in the time domain 52 into a corresponding spectral profile 54 having a discernible characteristic 56-60 in the frequency domain 62.

Taking a whistle—such as the Fox 40 pealess whistle which creates sound using air pressure only—as a simple example (in the exemplary context of a sporting contest, such as soccer), a whistle has a fairly narrowband fundamental frequency 64, a fixed duration 66 (related to the time of blow) and several noticeable first to third order harmonics 68-72 each having the same duration. Indeed, the spectrogram of FIG. 2 shows the whistle with a fundamental frequency and harmonic components at integer multiples of the fundamental frequency for the duration of the whistle. Unfortunately, given general background noise, a large surge in ambient background power would likely be unresolvable from a whistle blow when viewed in the time domain. However, by applying appropriate signal processing, such as a Fourier transform to a point in time, a plot 80 of cepstrum 82 against 1/frequency 84 produces a frequency domain characteristic having a spike when there is a rich harmonic content in the sampled time-domain signal. The Fourier transform operation, in this instance, picks out the periodicity of the frequency components in the time domain to produce the spike 56. In other words, for a discrete whistle-like event, the signal processing produces a profile 54 having a discernible characteristic representative of all the harmonics.

Since the template database includes a feature template for the whistle (again modelled in the frequency domain), the control algorithm 38 contrasts each stored feature template with each signal processed (captured) audio object to determine whether a match between the profiles exists. The match may, in fact, be based on a frequency component surpassing a predetermined threshold level 90. In the instance of the time domain 62 of FIG. 2, the spike 56 is a discernible characteristic that warrants inclusion of the captured audio into the final audio mix.

Since multiple directional microphones may, in fact, pick up the whistle event (albeit time offset), temporarily buffered sound events captured from multiple directional microphone sources may be aligned and used (through selective fader operation) to increase overall confidence that selection of the sound event is correct. Alternatively, just a single principal source may be used, with identified time-delayed events from other directional microphone sources discarded.

Figure 3:
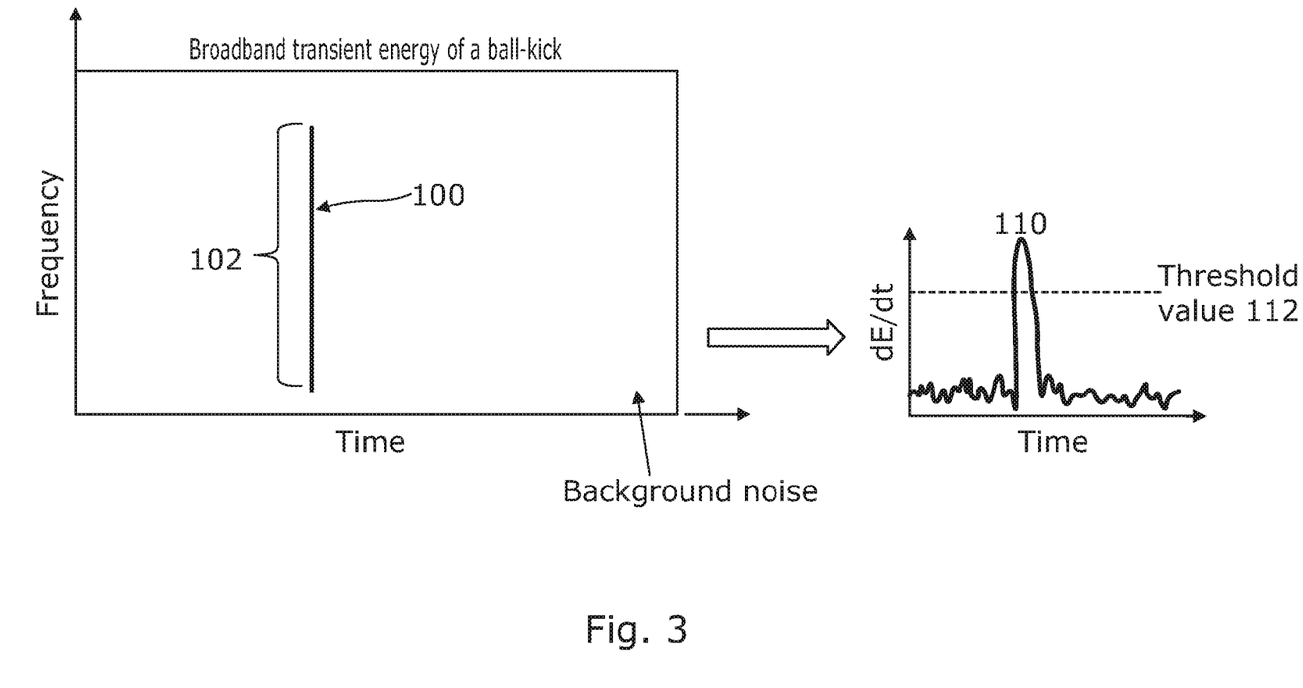
FIG. 3 shows a transposition of a second captured audio event in the time domain into a corresponding spectral profile having a discernible characteristic in the time domain.

By way of another example of a sound event feature, FIG. 3 shows a transposition of a captured audio event—in this case the noise generated when a ball is kicked hard—in the time domain into a corresponding spectral profile having a discernible characteristic in the time domain. In modelling a ball-kick, it is observed that the duration of the ball-kick noise event 100 is small, although the frequency components are moderately low frequency but span a relatively broad contiguous frequency band 102. Inevitably, in real time, the "thud" will appear above background noise, as detected by one or more directional microphones. Conversion to the frequency domain by signalling processing in this instance would yield no discernible profile for the ball kick relative to background ambient noise, although a plot of a rate of change in energy (dE/dt) with time (t) for different frequencies yields an audio event having a characterizing profile with a discernible energy spike 110 in the time domain. Again, comparison with a corresponding pre-stored feature template (or just relative to a predetermined threshold value) permits the processor 36 to identify if a notable sound event/sound object is present and then to cause assembly of a mixed sound stage that includes the captured sound event/sound object in the time-delayed broadcast. The assembled sound stage will therefore include the captured and buffered sound of, for example, the ball kick from at least one identified directional microphone, with this ball kick potentially (if desired) placed spatially within the sound stage such that, at reproduction from speakers at a home, the relative position of the sound may be suggested as being, perhaps, to the right hand side and rearward with respect to a front-central pan.

From the perspective of voice detection, such as a shouted instruction from a player involved in the game or a coach from the side-lines of a game, the skilled person will appreciate that other signal processing techniques can be applied to the captured (and buffered) time domain voice signal. A feature template, in the case of voice, may be modelled on zero-point crossing rates that are known to be indicative of general speech or, indeed, specific words (such as expletives). Alternatively, machine learning techniques, such as realized by neural network processing, can be employed to identify unique patterns in spectrograms. These may be used in association with, for example, an increase in energy that is suggestive of shouting to highlight the potential importance of the detected, region-specific sound event detected by a particular directional microphone.

A combination of signal processing and signal sampling approaches may also be used to analyse captured sound objects, with all these samples then appropriately compared by the processor 36 with pre-stored features templates to determine match conditions. The pre-stored feature templates therefore represent a set of reference standards against which sample data is compared, with a high level of correspondence (e.g. a statistically significant correspondence or absolute level comparison) between sample and template supporting sufficient decision confidence to warrant inclusion of the captured audio object in the sound stage in a broadcast.

Event features—and their corresponding profiles—modelled or otherwise empirically measured may be expansive in nature and may include voice, narrowband frequencies with harmonics or sound objects having a multitude of frequency components and may be assessed in the time or frequency domains using varying signal processing techniques to identify characteristic traits. Definitions of desired event features therefore are dependent upon the context of the event and identification of sound objects that are contextually important to the overall sound stage to be assembled for broadcast.

Figure 4:
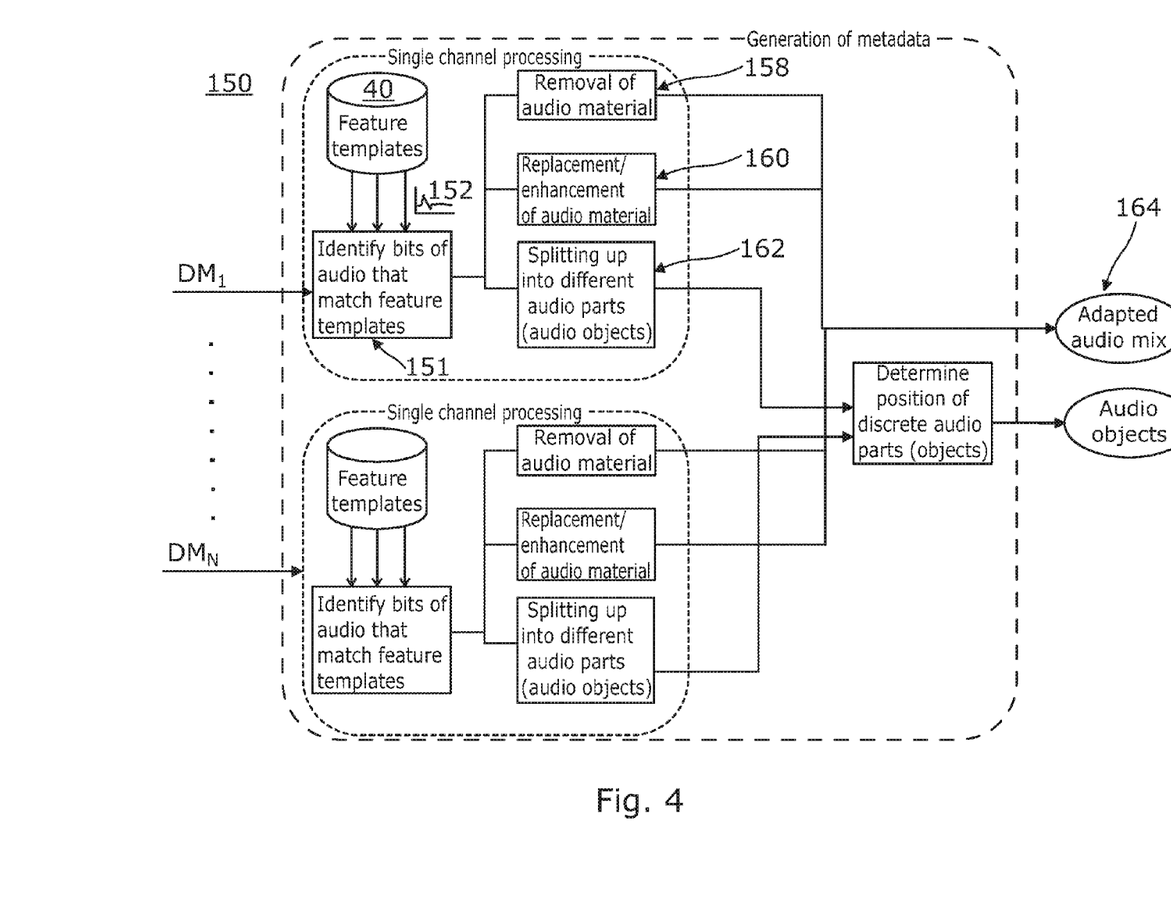
FIG. 4 is a schematic and functional block diagram of a microphone processing chain in the system of FIG. 1.

Turning to FIG. 4, there is shown a schematic and functional block diagram of a microphone processing chain 150 in the system of FIG. 1. Captured audio from a specific audio channel, e.g. directional microphone DM1, is assessed (by the processor 36 running control algorithm 28) to identify 151 whether sampled (and appropriately signal processed) bytes of audio have sufficient correlation with corresponding pre-stored feature templates 152 stored in database 40. For each match, buffered audio (corresponding to the sample) is subjected to single channel processing 154 that can take the form of one or more of: i) removal 158 of the captured audio material from any future broadcast, such as might be required to omit an offending word; ii) replacement and/or enhancement 160 of captured audio material, e.g. by inclusion of a sound effect that augments the buffered audio, by substitution of a new sound effect, by additional signal processing and/or overlaying or insertion of a pre-recorded phrase or the like; and/or iii) splitting up 162 of the captured audio into distinct audio parts in the event that the control algorithm is being used as part of an audio-object based broadcast system (in which, for example, an end-user is permitted to assemble a bespoke sound stage for reproduction through a their local audio loudspeaker system).

Following removal or replacement, the control algorithm brings about synchronization of the audio (if necessary and especially should there be a complimentary buffered video) to produce an adapted audio mix 164.

As shown in FIG. 4, each channel from each directional (rather than ambient) microphone is processed in a similar fashion to produce a complete sound stage which may be spatially weighted or effectively suitable for mono reproduction.

Figure 5:
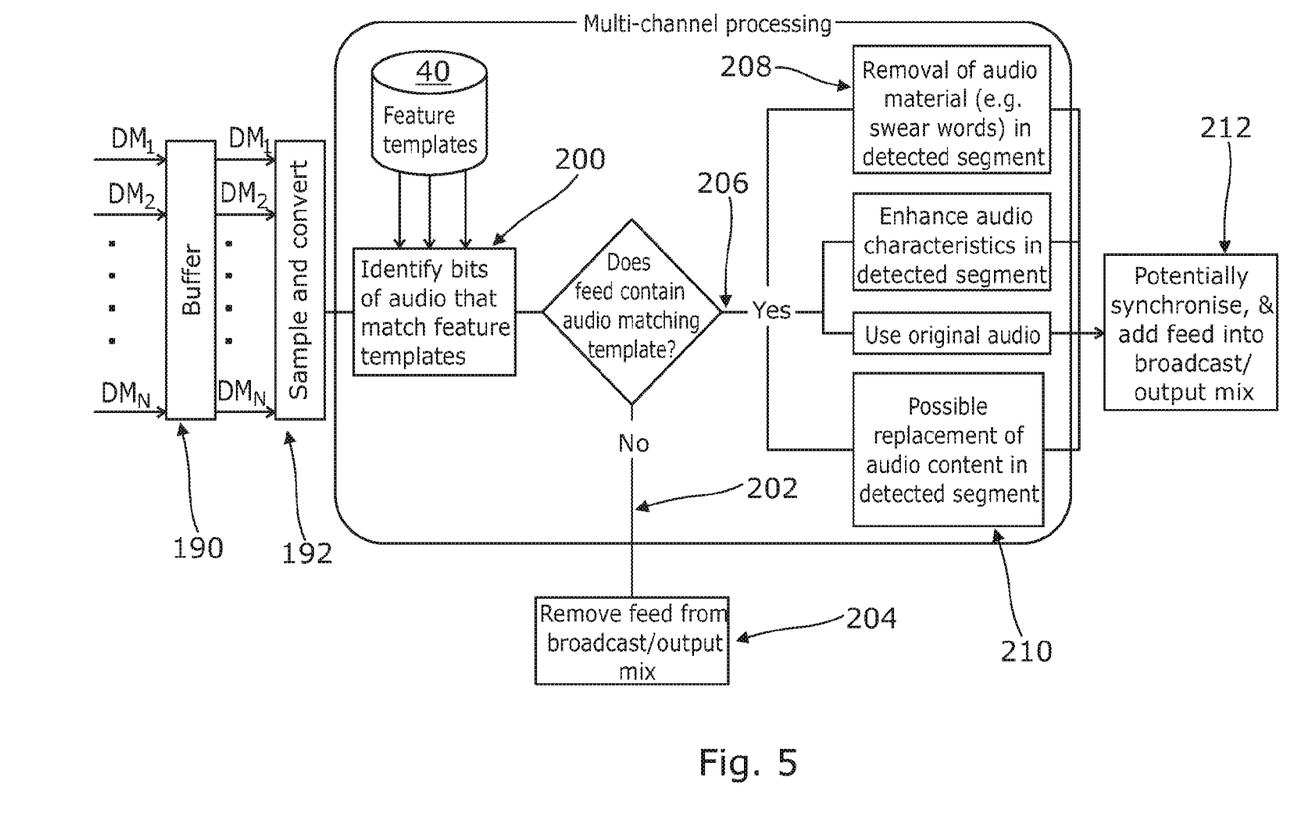
FIG. 5 is a multi-channel audio processing algorithm employed in the system of FIG. 1 and the microphone processing chain of FIG. 2.

Referring to FIG. 5, there is shown a preferred multi-channel audio processing algorithm employed in the system of FIG. 1 and the microphone processing chain of FIG. 2. Sound events are firstly buffered 190 and then sampled and converted 192 into appropriate signal representations for use in direct comparison of detected sound events present on each channel.

For each channel, i.e. microphone input ($DM_1$ to $DM_n$), the algorithm references and systematically tests 200 identified bits of captured and processed audio against each feature template (stored in database 40 of FIG. 1). An assessment 202 is then made as to whether each channel feed contains audio that matches one or more of the predetermined feature templates. In the negative 204, the channel feed can be rejected 204, i.e. removed, from consideration and omitted from any finally assembled/mixed audio. In other words, the corresponding channel fader on the mixer 30 can automatically be set low, unless specific manual over-ride by the sound engineer is initiated. In the affirmative 206, the control algorithm operates optionally either: (i) to remove 208 audio material, such as swear words, detected in an analysed audio segment; or (ii) replace, enhance, augment or leave unaltered 210 the audio content detected in an analysed audio segment.

Regardless, in all cases where there is a match 206 between sampled audio and the feature template (and unless manually overridden), matched audio in the buffer for each channel will be synchronized and added 212 to the audio output for broadcast. Of course, the audio from each channel doesn't necessarily need to be synchronised and combined. Sometimes a sound object commonly detected by multiple microphones can be included in the final mix simply by selecting the microphone with the highest match confidence, with this microphone signal then broadcast whilst other microphone signals (for the commonly detected sound object) are omitted from the overall content of the final mix.

The preferred embodiment therefore supports both assisted and/or fully automated mixing of channels to catch contextually relevant audio events and to present, preferably, these audio events in a spatial audio context in which relevant sounds from different individual channels are relatively displaced to produce a diegetic effect. As a minimum, contextually relevant audio events are included in a finally assembled audio output.

With respect to potential fields of application, the spatial audio mixing system (and particularly the control algorithm and audio templates supplied in the form of code on a computer readable medium or a download) can retrospectively adapt existing (installed) microphone systems to enhance contextual and/or spatial auditory awareness of audio events and, furthermore, improve realism and quality in the audio broadcast. The present audio mixing system can be used to support the broadcast of live events, especially stadium-based sports broadcasts where crowd noise can compromise audio feature resolution and on-pitch/field-of-play sounds are of importance to the narrative of the event. The system can also be employed to remove specific audio components from a microphone feed before broadcast, i.e. modelling of the feature template may reflect expletives that might be caught by a microphone used for speech and which could be removed from any time-delayed broadcast. Additionally, the undesirable interfering nature of loud public address announcement from PA system in live broadcasts can be detected by the system of the present invention and the related feed for the corresponding microphone automatically lowered in the mix.

Once sound event detection is accomplished, embodiments of the present invention permit the addition of and/or the swapping out of identified sounds into a mix for augmented special effect purposes. For example, the automated sound feature identification algorithm may be used to replace specific sounds with other sounds effects, such as novelty sound effects, every time a tennis player strikes the ball or to insert a beep instead of annunciating any expletive. For events such as baseball—which is often shown in bars where people are only half watching the screen—a different or enhanced sound could replace a conventional 'bat-crack' sound when the detected sound envelope has a certain defined characteristic associated, for example, with a strike event when the baseball has been hit particularly cleanly and/or hard (and is therefore likely to score a home run). The enhanced or substituted sound would, in these circumstances, draw the attention of those in the bar towards the broadcast and potentially to targeted advertising that is tied into such an identified event. Substitution could, also, take the form of a substitute word, including a linguistic translation. The enhanced or substituted sound would typically be stored in a database in accessible memory and the enhanced or substituted sound could itself take the form of a sound bite or even a video clip that could be inserted into a composite video frame as a "picture-in-picture" overlay frame. With delayed release of the broadcast, other forms of information content could be provided via keyboard entry, dictation or pre-stored commentary. Identification of sound events and augmentation, audio level enhancement or substitution of such identified sound events therefore increases user immersion in the broadcast sound stage, or otherwise can promote an activity of interest that is in some way related to the identified sound. In other words, in one embodiment, the identified sound acts as a trigger for complementary information (either sound and/or video) to be mixed into the live stream/broadcast.

It will be further understood that unless features in the particular preferred embodiments are expressly identified as incompatible with one another or the surrounding context implies that they are mutually exclusive and not readily combinable in a complementary and/or supportive sense, the totality of this disclosure contemplates and envisions that specific features of those complementary embodiments can be selectively combined to provide one or more comprehensive, but slightly different, technical solutions.

Unless the context requires a more limited interpretation, the terms "sound object(s)", "sound(s) of interest", "sound event(s)" and any variation thereof will be understood to be synonymous. The term "broadcast" should also be understood to be a time delayed transmission of the audio, although broadcast may be delayed for several seconds or significantly longer and may include provision of the audio output either on a streamed or wirelessly transmitted basis or otherwise distribution on a readable medium on which the final audio output is coded.

It will, of course, be appreciated that the above description has been given by way of example only and that modifications in details may be made within the scope of the present invention. For example, whilst the drawings refer to synchronized audio mixing with a video signal for TV broadcast of a soccer match, the present application can be applied to just radio audio broadcasts and/or any number of different audio events held in studios, arenas and the like. In the same way, the sound objects that are sought by the control algorithm may vary and, consequently, the examples of a ball-kick and referee's whistle are merely exemplary of sounds of interest. Pre-stored feature templates may therefore model any sound of contextual interest to an event (such as a whistle, discrete noise or an expletive word), with the feature templates based on pre-identified reference, signal processed sounds of interest presented in at least the time and/or frequency domains. The applied signal processing is selected such that resulting signal profiles (within each feature template) include identifiable triggers (e.g. peaks, rates of change, absolute values or occurrences) that can be used to assess correlation (i.e. substantial similarity) between a signal processed version of the sound object of interest and the reference sound that is identified by the feature template.

The invention claimed is:

1. A mixing system comprising:
   a multiplicity of microphones, each of said microphones assigned to a channel and configured to capture real-time sound events within a coverage region for that microphone;
   a buffer for storing captured sound events from each microphone;
   a memory storing at least one reference feature template indicative of a predetermined desired sound event;
   a processor configured to execute a control algorithm that:
   processes captured real-time sound events for each channel into samples having signal characteristics;
   for each channel, compares the signal characteristics in each sample with said at least one reference feature template to identify whether said captured real-time sound event has signal characteristics substantially corresponding to the at least one reference feature template; and
   in the event that the comparison indicates that correlation exists between the desired sound event and the captured real-time sound event for the channel, generating a final audio mix that includes a substitute output for the captured real-time sound event.

2. The mixing system according to claim 1, wherein the control algorithm is configured automatically to restrict an audio contribution of each channel to the final audio mix when correlation is assessed not to exist between the desired sound event and any captured real-time sound event for that channel.

3. The mixing system according to claim 1, wherein the control algorithm is configured to place a desired sound event, identified as present within a channel, spatially relative to other sound events within the final audio mix.

4. The mixing system according to claim 1, wherein the substitute audio output is selected from the group consisting of:
   a predetermined sound;
   a different audio track.

5. The mixing system according to claim 1, wherein the final audio mix is synchronized with a video recording.

6. The mixing system according to claim 5, wherein the control algorithm is configured to insert a message into the final audio output or the video recording when correlation exists between the desired sound event and the captured real-time sound event.

7. The mixing system according to claim 6, wherein the message is obtained from an advertising database accessed by the processor, the message containing at least some audio content.

8. The mixing system according to claim 1, wherein captured real-time sound events in the time domain are converted into a frequency domain representation.

9. The mixing system according to claim 1, wherein the sound event is at least one of:
   a word;
   a phrase;
   the sound generated by one thing striking another thing;
   a sound from a musical instrument;
   a sound for an alternate audio source; and a warning sound.

10. The mixing system according to claim 1, wherein the control algorithm processes captured real-time sound events for each channel into a plurality of samples for each captured real-time sound event, each of the plurality of samples providing a different assessment criteria for the same captured real-time sound event.

11. A method of assembling a time synchronized sound stage for broadcast, the method comprising:
    capturing real-time sound events at a multiplicity of microphones, each of said microphones assigned to a channel and a coverage region;
    buffering captured sound events from each microphone;
    signal processing captured real-time sound events for each channel into samples having signal characteristics;
    for each channel, comparing the signal characteristics in each sample with at least one reference feature template to identify whether said captured real-time sound event has signal characteristics substantially corresponding to said at least one reference feature, each reference feature template indicative of a predetermined desired sound event;
    in the event that the comparison indicates that correlation exists between the desired sound event and the captured real-time sound event for the channel, generating a final audio mix that includes:
    a substitute audio output for the captured real-time sound event.

12. The method according to claim 11, further comprising:
    automatically restricting an audio contribution of each channel to the final audio mix when correlation is assessed not to exist between the desired sound event and any captured real-time sound event for that channel.

13. The method claim 11, further comprising:
    placing a desired sound event, identified as present within a channel, spatially relative to other sound events within the final audio mix.

14. The method according to claim 11, wherein the substitute audio output is selected from the group consisting of:
    a predetermined sound;
    a different audio track.

15. The method according to claim 11, wherein the final audio mix is synchronized with a video recording.

16. The method according to claim 15, further comprising:
    inserting a message into the final audio output or the video recording when correlation exists between the desired sound event and the captured real-time sound event.

17. The method according to claim 11 further comprising:
    Fourier transforming time domain captured real-time sound events into frequency domain representations.

18. A non-transitory computer readable medium having stored thereon code that, when executed by a processor, performs audio mixing functions according to claim 11.

* * * * *